United States Patent
Erikson (10) Patent No.: US 6,829,197 B2
(45) Date of Patent: *Dec. 7, 2004

(54) ACOUSTICAL IMAGING INTERFEROMETER FOR DETECTION OF BURIED UNDERWATER OBJECTS

(75) Inventor: Kenneth R. Erikson, Henniker, NH (US)

(73) Assignee: BAE Systems Information and Electronic Systems Integration INC, Nashua, NH (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/630,079

(22) Filed: Jul. 30, 2003

(65) Prior Publication Data

US 2004/0027919 A1 Feb. 12, 2004

Related U.S. Application Data

(63) Continuation-in-part of application No. 10/219,169, filed on Aug. 14, 2002, now Pat. No. 6,700,833.
(60) Provisional application No. 60/322,694, filed on Sep. 17, 2001.

(51) Int. Cl.[7] .............................................. G01S 15/89
(52) U.S. Cl. .............................. 367/88; 367/7; 367/131; 348/81
(58) Field of Search ............................. 367/7, 88, 131; 348/81

(56) References Cited

U.S. PATENT DOCUMENTS

| | | | | |
|---|---|---|---|---|
| 3,738,248 A | * | 6/1973 | Fish et al. | ..................... 396/28 |
| 4,105,990 A | * | 8/1978 | Rines et al. | ................... 367/96 |
| 4,922,467 A | | 5/1990 | Caulfield | |
| 4,991,149 A | | 2/1991 | Maccabee | |
| 5,357,063 A | | 10/1994 | House et al. | |
| 5,482,044 A | | 1/1996 | Lin et al. | |
| 5,598,152 A | | 1/1997 | Scarzello et al. | |
| 5,621,345 A | | 4/1997 | Lee et al. | |
| 5,732,706 A | | 3/1998 | White et al. | |
| 6,159,149 A | | 12/2000 | Erikson et al. | |
| 6,325,757 B1 | | 12/2001 | Erikson et al. | |
| 6,438,071 B1 | * | 8/2002 | Hansen et al. | ................. 367/88 |
| 6,700,833 B2 | * | 3/2004 | Erikson | ....................... 367/88 |

OTHER PUBLICATIONS

Sabatier, James M. et al, "Laser–Doppler Based Acoustic–to–Seismic Detection of Buried Mines", SPIE Conference on Detection and Remediation Technologies for Mines and Minelike Targets IV, SPIE, vol. 3710, pp. 215–222, 1999.
Simpson, Harry J. et al, "Synthetic array measurements of acoustical waves propagating into a water–saturated sandy bottom for a smoothed and a roughened interface", J. Acoust. Soc. Am. 107 (5), Pt. 1, May 2000, pp. 2329–2337.

(List continued on next page.)

Primary Examiner—Ian J. Lobo
(74) Attorney, Agent, or Firm—Maine & Asmus (57) ABSTRACT

Techniques for underwater detection of fully or partially buried objects such as sea mines and underwater cables are disclosed. An acoustical camera produces three dimensional volumetric images of a target area volume of an underwater floor. One or more first images are produced of the target area volume. An acoustical transducer pulse is then directed to the target area volume so as to disturb the loose particulate or elastic matter included in the target area. One or more second images are then produced while the pulse is present in the target area volume. The images can be compared for evidence of buried objects, or to otherwise evaluate objects included in the target area. The camera can be configured with an interferometer mode so as to produce volumetric images at a real-time frame rate.

20 Claims, 5 Drawing Sheets

OTHER PUBLICATIONS

Malmberg, Roy Dale, "A Study of the Feasibility of Using a Buried Sonar Transducer to Echo–Locate Objects Buried in Sediment", Naval PostGraduate School, Monterey, CA, Sep. 1987.

Sschmidt, Henrik et al, "Physics of 3–D scattering from rippled seabeds and buried targets in shallow water", J. Acoust. Soc. Am. 105 (3), 1999.

Smith, Eric, "Measurement and localization of interface wave reflections from a buried target", J. Acoust. Soc. Am. 103 (5), Pt. 1, May 1998, pp. 2333–2343.

Younis, Waheed A. et al, "Nondestructive imaging of shallow buried objects using acoustic computed tomography", J. Acoust. Soc. Am. 111 (5), Pt. 1, May 2002, pp. 2117–2127.

Frazier, Catherine H. et al, "Acoustic imaging of objects buried in soil", J. Acoust. Soc. Am. 108 (1), Jul. 2000, pp. 147–156.

Powers, Jeffrey E. et al, "Ultrasound Phased Array Delay Lines Based on Quadrature Sampling Techniques", IEE Trans. On Sonics & Ultrasonics, vol. SU–27(6), pp.287–294, Nov. 1980.

Donskoy, Dimitri et al, "Nonlinear seismo–acoustic land mine detection and discrimination", J. Acoust. Soc. Am. 111 (6), Jun. 2002, pp/ 2705–2714.

* cited by examiner

ACOUSTICAL IMAGING INTERFEROMETER FOR DETECTION OF BURIED UNDERWATER OBJECTS

RELATED APPLICATIONS

This application is a continuation-in-part of U.S. application Ser. No. 10/219,169, filed Aug. 14, 2002 now U.S. Pat. No. 6,700,833, which claims the benefit of U.S. Provisional Application No. 60/322,694, filed Sep. 17, 2001. Each of these applications is herein incorporated in its entirety by reference.

FIELD OF THE INVENTION

The invention relates to imaging systems, and more particularly, to an acoustical imaging interferometer for detection of buried underwater objects.

BACKGROUND OF THE INVENTION

Techniques enabling the detection of buried objects have a number of useful and important applications. For example, land mines and other such anti-personnel weapons remaining from past wars are a scourge in many countries. Likewise, sea mines present equally devastating hazards, and continue to deny coastal waters to fisherman and civilians. In time of war, military operations are also impeded or denied by the presence of mines.

Figure 1:
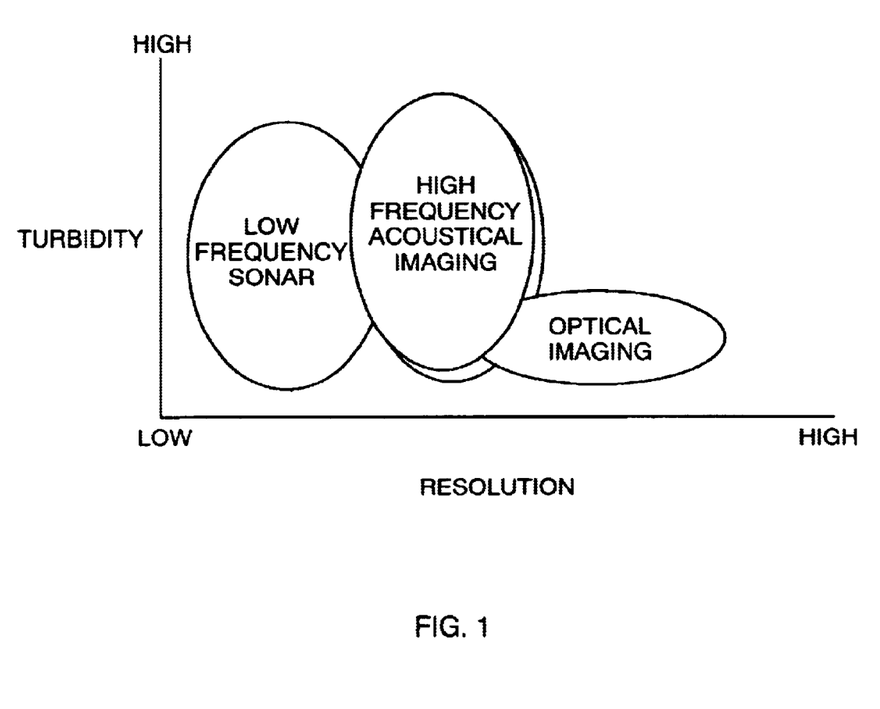
FIG. 1 depicts the relative imaging resolution of sonar, high frequency acoustical and optical systems in water of varying turbidity.

Mines that are tethered below the water surface or standing proud on the seafloor can be detected by existing means or by systems in advanced development. Acoustical imaging methods are effective for tethered and proud mines even in very turbid littoral waters, where optical methods often fail. Low frequency sonar systems may also be employed and do not have the limitations of optical systems in turbid water. FIG. 1 provides a diagrammatic presentation of the relative turbidity versus resolution potential of conventional sonar, acoustical and optical imaging systems.

Many sea mines are designed to progressively bury themselves through the scouring action of water movement on the seafloor. Optical, sonar and conventional acoustical imaging systems are not effective for detecting such buried mines. In addition, many sea mines are constructed of non-magnetic or non-metallic materials such as fiberglass composites and are virtually undetectable by electromagnetic means. As a result, partially or completely buried mines, as well as other objects, remain difficult to detect.

What is needed, therefore, are techniques that enable the detection of buried underwater objects.

BRIEF SUMMARY OF THE INVENTION

One embodiment of the present invention provides a system for detecting underwater buried (either partially or completely) objects. The system includes an acoustical camera that is adapted to produce three dimensional volumetric images of an underwater target area volume of an underwater floor. An acoustic transducer is adapted to apply an acoustic pulse to the target area volume so as to cause displacement of materials included in the target area volume. A controller is adapted to coordinate operation of the camera and the acoustic transducer, so that a volumetric image of the target area volume can be produced while the acoustic pulse is present in the target area volume. As such, buried objects can be detected based on relative movements in the target volume area. In one particular embodiment, a first volumetric image of the target area volume is produced before the acoustic pulse is applied, and a second volumetric image of the target area volume is produced while the acoustic pulse is present in the target area volume.

The controller can be further adapted to compare volumetric images for evidence of buried objects. The evidence of buried objects can be based, for example, on movement of floor materials relative to the buried objects. The camera may be configured to produce volumetric images of the underwater target area volume at a real-time frame rate, and may be further adapted to operate in an interferometer mode having a resolution of less than one wavelength. In one particular embodiment, the camera is configured for producing volumetric images within a 16 feet range at a frame rate greater than 10 frames/second, and has an acoustical lens configured for forming images on an array of acoustical transducer elements (e.g., piezocomposite).

The system may further include an image recorder that is adapted to record the volumetric images. The system may further include an image discrimination module adapted to discriminate interesting objects from non-interesting objects detected in the volumetric images. The system may further include a range finder that is adapted to detect when the system is at a proper distance from the target area volume for imaging purposes. Other variations will be apparent in light of this disclosure. For instance, note that the acoustical transducer can be extendible towards the target area volume (e.g., via operation of a mechanical arm).

Another embodiment of the present invention provides a method for detecting underwater buried (either partially or completely) objects. The method includes producing one or more three dimensional volumetric images of an underwater target area volume of an underwater floor, and applying an acoustic pulse to the target area volume so as to cause displacement of materials included in the target area volume. The method continues with producing one or more second volumetric images of the target area volume while the acoustic pulse is present in the target area volume. Producing volumetric images of the underwater target area volume may be performed at a real-time frame rate, and/or using a resolution of less than one wavelength.

The method may further include comparing volumetric images for evidence of buried objects. In one such embodiment, comparing volumetric images for evidence of buried objects includes detecting movement of floor materials relative to the buried objects. The method may further include recording the volumetric images. The method may further include discriminating interesting (e.g., man-made) objects from non-interesting (e.g., rocks) objects detected in the volumetric images. The method may further include detecting a proper distance from the target area volume for imaging purposes (e.g., based on camera range limitations). Note that not only can objects which are partially or completely buried be detected, but they can also be categorized, identified, or otherwise characterized.

The features and advantages described herein are not all-inclusive and, in particular, many additional features and advantages will be apparent to one of ordinary skill in the art in view of the drawings, specification, and claims. Moreover, it should be noted that the language used in the specification has been principally selected for readability and instructional purposes, and not to limit the scope of the inventive subject matter.

DETAILED DESCRIPTION OF THE INVENTION

Embodiments of the present invention provide imaging techniques for detecting partially or fully buried underwater objects, including both man-made objects (e.g., cables, seafloor sensors, hulls, fuselages, mines, and other munitions) and natural objects (e.g., rocks). The disclosed techniques require no light, and employ three dimensional images to discriminate loose underwater floor materials from larger, more solid objects partially or fully buried beneath the underwater floor. The size and shape of an object can also be determined from the images, which in turn allows natural objects to be distinguished from man-made objects.

In operation, low frequency acoustical pulses are used to disturb the elastic underwater floor materials, thereby revealing the presence of objects buried immediately below that floor. This is possible due to a buried object's relative non-motion as compared to the moving surrounding elastic floor materials. Three dimensional images are produced by an acoustical imaging interferometer before, during, and/or just after the application of low frequency acoustical pulses. Thus, some degree of detectable movement of the surrounding elastic floor materials relevant to non-moving underwater objects will be evident in the images.

Acoustical Imaging Interferometer System

Figure 2:
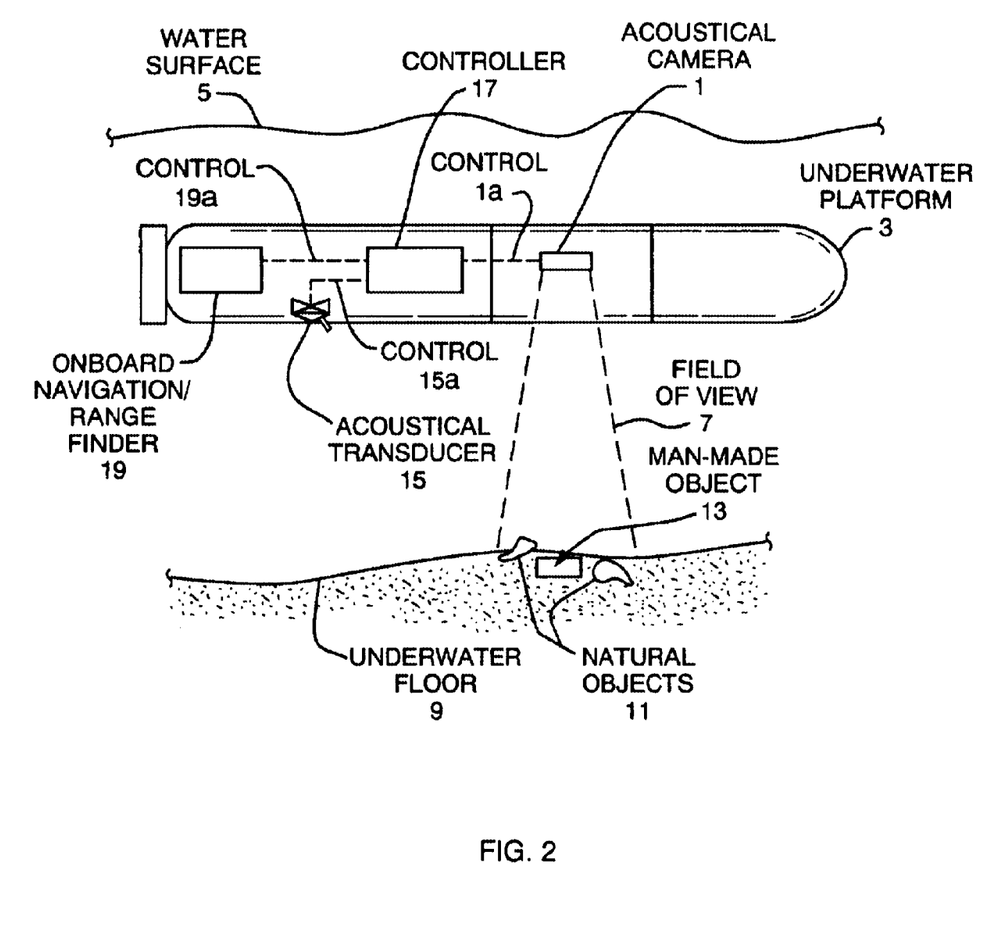
FIG. 2 is a diagrammatic depiction of a system for detecting buried underwater objects configured in accordance with one embodiment of the present invention.

FIG. 2 is a diagrammatic depiction of a system for detecting buried underwater objects configured in accordance with one embodiment of the present invention. As can be seen, the system includes an acoustical camera 1, a low-frequency acoustical transducer 15, and a controller 17 mounted or otherwise included in an underwater vehicle or platform 3. An on-board navigation and range finder 19 is also included in this embodiment. Other features, componentry, and sub-systems may also be included as will be apparent in light of this disclosure, such as a countermeasure system (e.g., operatively coupled with the on-board navigation) and a communication interface (e.g., included in the controller 17) that allows the system to communicate with a surface host.

In operation, the platform 3 is positioned in proximity to a target area volume of underwater floor 9, which may be, for example, a seafloor, riverbed, or lakebed. The controller 17 coordinates the operation of the camera 1 with the operation of the transducer 15. In particular, the transducer 15 is commanded to apply a high intensity, low frequency tone burst or single acoustical pulse to the underwater floor 9 that causes elastic floor material to move a detectable amount, but has little or no effect on objects of relatively higher elasticity or density. The camera 1 is commanded to capture a number of image planes of the target volume before, as well as during and/or just after application of the acoustic pulse or pulses. The image planes are then used to form three dimensional volumetric images.

The controller 17 analyzes the three dimensional volumetric images for evidence of movement and non-movement, so as to identify profiles of buried objects in the target volume area. Recognizable shapes, sizes, and other distinguishable characteristics can then be interrogated (e.g., by a system operator, the controller 17, or an external computer system) to discriminate between man-made and natural objects, as well as to identify objects of interest.

In the embodiment shown, the platform 3 operates autonomously under the control of an on-board navigation/range finding sub-system 19. This sub-system may include, for example, a pre-programmed itinerary, where geophysical coordinates or other location parameters of the target area and volume are known. Alternatively, underwater platform 3 can be tethered to and towed by a surface vehicle or submarine that controls the platform movement. The shape of the platform 3 can vary depending on the particular application. In general, the platform 3 is transportable or otherwise movable along and above the underwater floor at a suitable distance, thereby enabling the features of the present invention to be exploited.

In the example shown in FIG. 2, the acoustical camera 1 has downward directed field-of-view (FOV) 7. Thus, images can be taken of the floor 9 target area included, which includes one or more man-made objects 13 (e.g., mine), as well as natural objects 11 (e.g., rocks). The acoustical camera 1 can be configured to operate in a mode that is highly sensitive to small changes in range on the order of fractions of the acoustical imaging wavelength. In such a mode, the acoustical camera 1 is operating as an imaging interferometer.

In one particular embodiment, the camera 1 is a 3 MHz ultrasonic underwater camera that operates without light either monostatically (in a pulse-echo mode) or bi-statically (with a separate transmitter) to produce three dimensional volumetric images within a range of 5 to 16 feet from the floor 9, and at a frame rate of 15 frames/second. A seven inch diameter acoustical lens of camera 1 forms an image on a fully-populated, 128×128 array (16,384 channels) of piezocomposite, acoustical transducer elements. The array and lens component of the acoustical camera 1 will be further discussed in reference to FIG. 3.

The transducer 15 can be implemented, for example, with a low frequency acoustical transmitter that is adapted to transmit a high-intensity, low frequency toneburst or impulse to the floor 9 towards the area of interest illuminated by FOV 7. While this acoustical pulse is present in the camera FOV 7, a second image is taken by the acoustical camera 1 in the same manner as the first. Note that images may be taken just after the acoustical pulse is applied to the FOV 7, so as to capture residual vibratory action of the pulse.

Note that the transducer 15 may be extendible from the platform 3 towards the floor 9 for applying an acoustical pulse at a precise range. Once imaging is complete, the extended transducer can be retracted back to its stowed position, thereby allowing for movement or transporting of the platform.

In the FOV 7, regions where the floor 9 consists of mud, silt or sand, and other loose elastic floor material will be displaced or otherwise detectably disturbed by the low frequency pulse provided by the transducer 15. Solid objects 11 and 13 will experience relatively less displacement in comparison to such floor materials. In addition, buried objects, such as man-made object 13, will influence the displacement of the floor materials, depending on their burial depth. By comparing first (pre-pulse) and second (during and/or after pulse) images, buried objects within the FOV 7 may be detected. A process for analyzing the detected objects can then be carried out to categorize (e.g., man-made or natural), identify (e.g., based on known mine profiles), or otherwise characterize those objects.

Controller 17 can be implemented, for example, with a programmable microcontroller or other suitable processing environment configured with a processor (e.g., for analyzing images and coordinating operation of the camera 1 and transducer 15), a memory (e.g., for storing images and related information), an input/output capability (e.g., for triggering operation of the camera 1 and the transducer 15 via control 1a, 15a, and 19a, respectively, and for transmitting analysis results or imaging data to surface-based processor), and a number of pre-programmed processes (e.g., image discrimination module, and an N-image plane trigger module operating in conjunction with a vibratory pulse trigger module) for carrying out the principles of the present invention.

Other features and componentry of the system illustrated in FIG. 2 will be apparent in light of this disclosure. For example, time, date, and location information associated with each image collected may be stored in memory (e.g., included in the controller 17). There may be a communication link (e.g., cable) for transmitting image and other data to a surface-based or other operations center, as well as sending communications from the operations center to the system. Location parameters associated with the image data may be included with the image data (e.g., based on pre-defined coordinates). Alternatively, such location parameters can be associated with the image data at the operations center.

There may also be a computer-based or operator monitoring capability (e.g., pattern recognition routine or display) for discriminating man-made from natural objects detected in the images, so that the detected and characterized objects can be marked for immediate or otherwise prioritized consideration. The system may further include a short range sonar system for detecting the distance from the camera 1 to the floor 9 currently in the FOV 7 (such as the range finder included in sub-system 19). Distance information could be provided to the navigation system of (whether on-board as with sub-system 19 or external) for either adjusting the location of the platform 3 over the floor 9, or adjusting the range of the camera 1 to correctly place the image volume to include the target area volume. Other sensors, actuators, and desirable features may be incorporated into the system for routine or exceptional use depending on the objectives and requirements of a given application.

Acoustical Camera with Interferometer Mode

Figure 3:
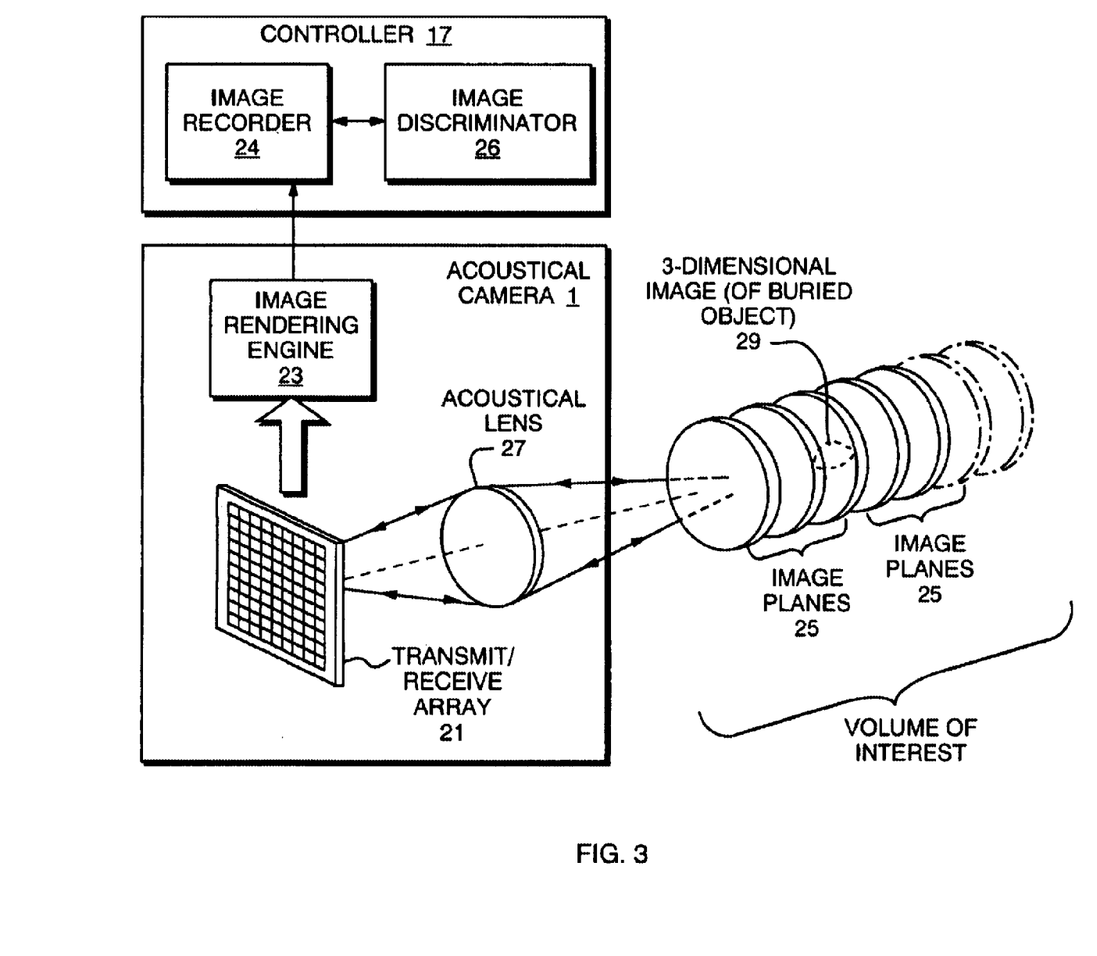
FIG. 3 is a perspective view of an array and lens component of an acoustical camera for use in the system of FIG. 2, and configured in accordance with an embodiment of the present invention.

FIG. 3 is a perspective view of an array and lens component of an acoustical camera for use in the system of FIG. 2, and configured in accordance with an embodiment of the present invention. In operation, a pulse of sound (ping) transmitted from the acoustical transmit/receive array 21 is reflected from the target area and is received by all array elements of the array 21 simultaneously, via an acoustical lens 27. A number (P) of image planes 25 defining a first layer of the volume of interest in the vicinity of the target area are range-gated from this single pulse return, processed, stored and multiplexed out from the array 21 to the image-rendering engine 23. On the next pulse, the range gates are delayed to provide the next P planes of data, thereby defining a second layer just beyond and adjacent to the first layer.

The three dimensional volumetric images produced by the image rendering engine can then be recorded or otherwise stored by the image recorder 24 of the controller 17. The image discriminator module 26 can then analyze the three dimensional volumetric images for evidence of buried objects based on detectable relative movements (e.g., based on magnitude and/or phase information measured on the echoes received back from the target volume area).

In one particular embodiment, the number P of image planes 25 per ping is eight. Thus, with a 128×128 receiver array and only 10 pings, an entire 128×128×80 volume of information is received, corresponding to the volume of interest in the target area. Processing of the volume of information will enable a determination of the presence of a buried object in the volume of interest, indicated in FIG. 3 by the three dimensional volumetric image 29. The acoustic lens 27 is approximately seven inches in diameter, and forms images on the 128×128 receiver array, which can be comprised of, for example, piezocomposite, acoustical transducer elements.

Variations of the acoustic camera configuration will be apparent in light of this disclosure. For example, acoustic transducer elements other than piezocomposite, such as electrostrictive or magnetostrictive, can be used here as well. Also, the array 21 may be configured as a receive array only. In such an embodiment, the transmitted pulses can be provided by an external transducer or other acoustical source. The array 21 and lens 27 sizes will vary depending on factors such as desired resolution, range of the imaging system, and the FOV 7 size. In addition, although the three dimensional volumetric images can be formed within the camera 1, they can also be formed externally. For example, the engine 23 may generate two-dimensional images, which are provided to a 3-D image formation module (e.g., included in the controller 17 or a stand alone module operatively coupled to camera 1 and the controller 17).

Unlike beamformed systems that receive and process data along single rays, the acoustical camera 1 provides this volume image out to useful ranges at a real-time frame rate. Table 1 provides the characteristics of an acoustical camera 1 in accordance with one embodiment of the present invention. At a 13 foot range, for example, a 3×3×2.6 feet volume intersecting the plane of the underwater floor is imaged with a resolution of a one half inch cube at 15 frames per second.

TABLE 1

| CAPABILITY | PERFORMANCE |
| --- | --- |
| Frequency | 3 MHz (0.5 mm wavelength) |
| Range | >16 ft |
| xy Resolution | ½ in @ 13 ft |
| Field of View (FOV) | 14 degrees (3 × 3 ft @ 13 ft range) |
| Pixel Count | 128 × 128 (16,384 simultaneous channels) |
| Number of range planes | 80 (assuming 8 images planes and 10 pings) |
| Frame rate for 80 planes | 15 frames/sec |
| Imaging range resolution | <3 mm |
| Interferometer mode resolution | <1/100 wavelength (0.005 mm) |
| Quadrature Sampling Rate | 12 MHz |
| Lens Diameter | 7 inches |

Note that other camera configurations can be used here as well, and the present invention is not intended to be limited to any one such embodiment. For example, the upper end of the range may be lower (e.g., 3 ft) or higher (e.g., 20 ft). Likewise, the frame rate may be lower (e.g., 10 frames/sec)

or higher (e.g., 20 frames/sec), and depends on whether a real-time frame rate is desired. Similarly, the xy resolution, pixel count, number of range planes, and lens diameter can all be varied depending on the application and the desired performance.

Figure 4:
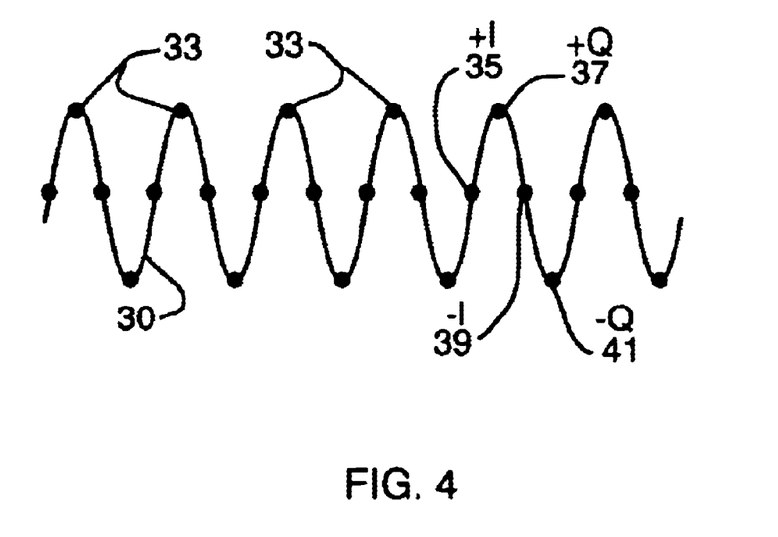
FIG. 4 illustrates a real-time volumetric imaging response waveform at a single pixel of the two-dimensional acoustical transmit/receive array of FIG. 3.

FIG. 4 illustrates a real-time volumetric imaging response waveform at a single pixel of the two-dimensional acoustical array 21 of FIG. 3. As can be seen in this example, the received echo waveform from the target area (including any objects within the FOV 7) is sampled at four times per cycle (i.e., four times per wavelength), as indicated by sample points 33. The in-phase (I and –I) samples 35 and 39 and quadrature (Q and –Q) samples 37 and 41 are separately and simultaneously sampled, averaged, and recorded for each of the pixels in the array 21 by the array 21 (16,384 pixels, assuming a 128×128 array).

These samples may be converted to a magnitude and phase values for each echo through Equations 1 and 2.

Magnitude=sqrt{(+$I$-(-$I$))$^2$+(+$Q$-(-$Q$))$^2$} (Equation 1)

Phase=atan{(+$Q$-(-$Q$))/(+$I$-(-$I$))} (Equation 2)

In the acoustical camera 1, only the magnitude value is typically used to form an image. Three-dimensional information is preserved from the range planes (of which there are 80 for the example camera configuration of Table 1) by detecting the first plane in which there is an echo from the exterior surface of the object. The magnitude of the signal together with the plane in which it occurred is used by the image-rendering engine 23 to form a pseudo-three dimensional volumetric image. The formed three dimensional images can the be displayed or otherwise analyzed (e.g., by the image discriminator module 26 of the controller 17).

Figure 5:
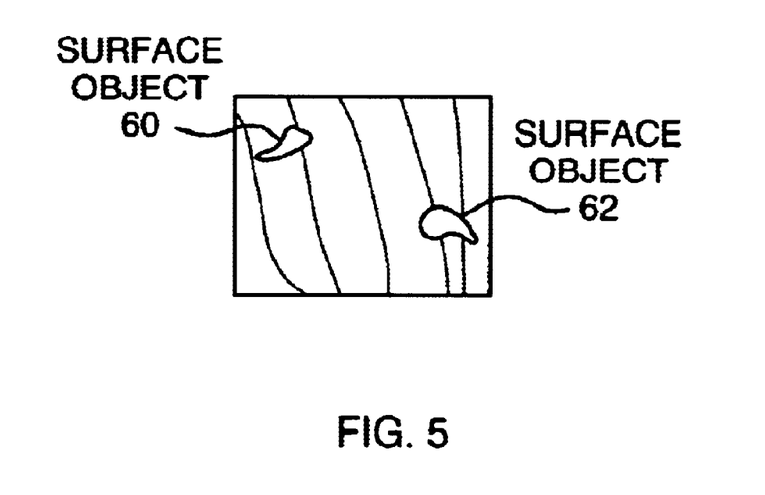
FIG. 5 illustrates an image made with the system of FIG. 2 prior to application of an acoustic vibratory pulse.

FIG. 5 illustrates an image made with the system of FIG. 2 prior to application of an acoustic vibratory pulse. Here, surface objects 60 and 62, as well as contour lines of the underwater floor, are present in the image.

Figure 6:
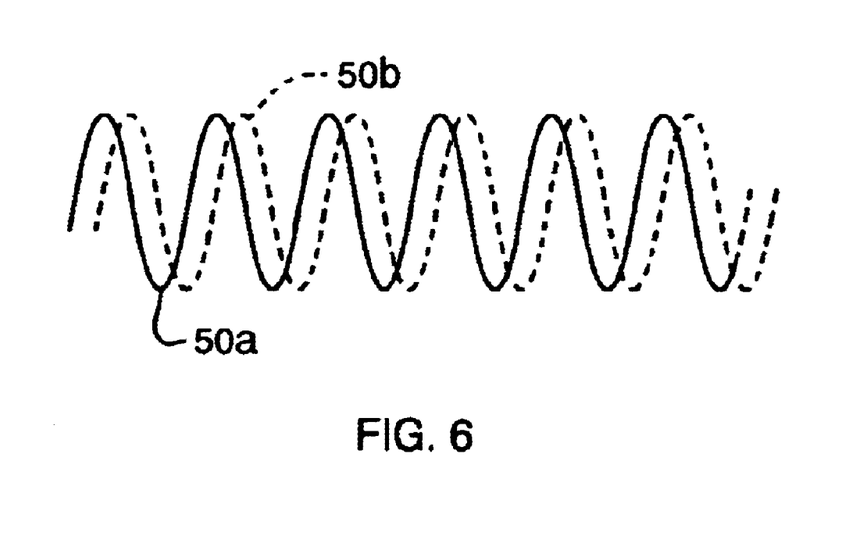
FIG. 6 is a comparison of waveforms generated at a single pixel of the transmit/receive array of the system in FIG. 2, the waveforms indicating displacement associated with application of an acoustic vibratory pulse.

FIG. 6 is a comparison of waveforms generated at a single pixel of the array 21 of the system in FIG. 2. The waveforms 50a and 50b indicate displacement associated with application of an acoustic vibratory pulse (e.g., 50a is the pre-pulse waveform and 50b is the during-pulse waveform). The interferometer mode of the acoustical camera 1 uses waveform sampling to differentially measure displacement of objects by comparing the phase of the echo signal at each of the pixels (e.g., 16,384) between sequential images 50a and 50b. The image-rendering engine 23 can be configured to make this comparison. Alternatively, the controller 17, can be configured to make the comparison based on sampled data provided by the camera 1.

Using quadrature detection of an incident 3 MHz gated sinusoidal waveform, displacements on the order of 1/100 of an acoustical wavelength (0.005 mm) may be detected. Note that this displacement is measured simultaneously and independently for each pixel. The frequency of sampling may be adjusted as needed. For instance, higher order sampling be used in alternate embodiments to improve the accuracy of the phase measurements.

The displacement between images can be provided by a high-intensity, low frequency toneburst from transducer 15 of FIG. 2. The acoustical frequency and intensity are selected to provide displacement of the floor 9 sufficient for the imaging interferometer (camera 1) to detect the motion. In one particular embodiment, the acoustical transducer 15 transmits a signal having a frequency of 500 Hz, and an intensity of 10 Watts/cm$^2$, which provides adequate displacement to the floor 9 to detect buried objects. The frequency and intensity of the low frequency vibratory energy may be varied according to the materials of the underwater floor and the resolution capabilities of the imaging interferometer.

Figure 7:
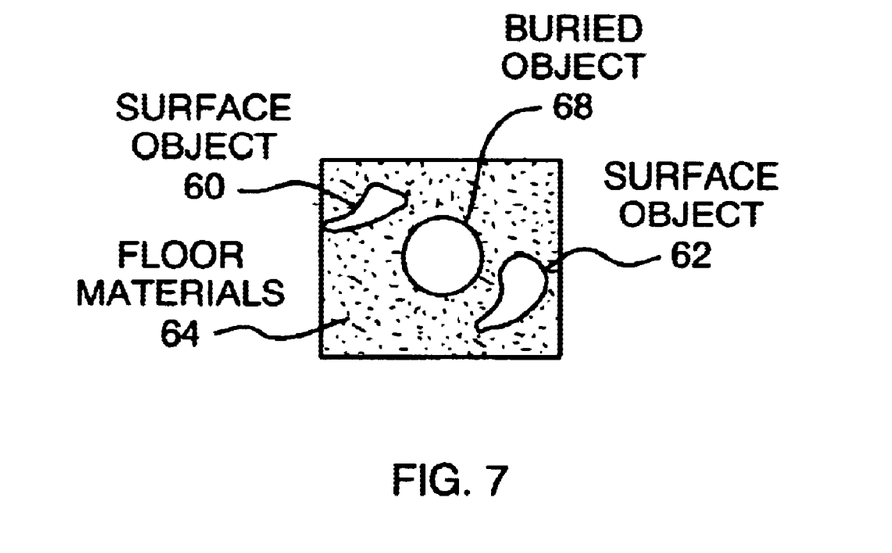
FIG. 7 illustrates an image made with the system of FIG. 2 during and/or just after application of an acoustic vibratory pulse.

FIG. 7 illustrates an image made with the system of FIG. 2 during and/or just after application of an acoustic vibratory pulse. With reference to FIG. 6, comparison of pixels from a first image 50a and second image 50b show pixels that have had little or no displacement, such as objects 60 and 62. Larger displacements are attributed to the mobility of the water-saturated silt or sand floor materials 64. Intermediate displacement occurs in the region surrounding buried object 68, as well as the regions surrounding partially buried objects.

Note that buried objects could be rocks or otherwise non-interesting objects. However, man-made objects of interest generally have geometrical shapes, which will be apparent in the images. As such, an operator viewing the images on a display, for example, could discern man-made objects from natural objects. Alternatively, there may be an algorithm programmed to comparing the first and second images for evidence of movement of floor materials relative to the non-movement of objects detected between the first and second images. Numerous conventional pattern recognition schemes or other comparative algorithms can be employed here, thereby enabling differences between the images to be resolved.

The foregoing description of the embodiments of the invention has been presented for the purposes of illustration and description. It is not intended to be exhaustive or to limit the invention to the precise form disclosed. Many modifications and variations are possible in light of this disclosure. It is intended that the scope of the invention be limited not by this detailed description, but rather by the claims appended hereto.

What is claimed is:

1. A system for detecting underwater buried objects comprising:

an acoustical camera adapted to produce three dimensional volumetric images of an underwater target area volume of an underwater floor;

an acoustic transducer adapted to apply an acoustic pulse to the target area volume so as to cause displacement of materials included in the target area volume; and a controller adapted to coordinate operation of the camera and the acoustic transducer, wherein a first volumetric image of the target area volume is produced before the acoustic pulse is applied, and a second volumetric image of the target area volume is produced while the acoustic pulse is present in the target area volume.

2. The system of claim 1 wherein the camera produces volumetric images of the underwater target area volume at a real-time frame rate.

3. The system of claim 1 wherein the camera is further adapted to operate in an interferometer mode having a resolution of less than one wavelength.

4. The system of claim 1 wherein the controller is further adapted to compare volumetric images for evidence of at least one of a partially or completely buried object.

5. The system of claim 4 wherein the evidence of buried objects is based on movement of floor materials relative to the buried objects.

6. The system of claim 1 further comprising:

an image recorder adapted to record the volumetric images.

7. The system of claim 1 wherein the acoustical transducer is extendible towards the target area volume.

8. The system of claim 1 further comprising:
an image discrimination module adapted to discriminate interesting objects from non-interesting objects detected in the volumetric images.

9. The system of claim 1 further comprising:
a range finder adapted to detect when the system is at a proper distance from the target area volume for imaging purposes.

10. The system of claim 1 wherein the camera is configured for producing volumetric images within a 16 feet range at a frame rate greater than 10 frames/second, the camera having an acoustical lens configured for forming images on an array of acoustical transducer elements.

11. A system for detecting underwater buried objects comprising:
an acoustical camera adapted to produce three dimensional volumetric images of an underwater target area volume of an underwater floor;
an acoustic transducer adapted to apply an acoustic pulse to the target area volume so as to cause displacement of materials included in the target area volume; and
a controller adapted to coordinate operation of the camera and the acoustic transducer, so that a volumetric image of the target area volume is produced while the acoustic pulse is present in the target area volume, thereby allowing buried objects to be detected based on relative movements in the target volume area.

12. The system of claim 11 wherein the camera is further adapted to operate as an acoustical imaging interferometer having a resolution of less than one wavelength.

13. A method for detecting underwater buried objects comprising:
producing one or more three dimensional volumetric images of an underwater target area volume of an underwater floor;
applying an acoustic pulse to the target area volume so as to cause displacement of materials included in the target area volume; and
producing one or more second volumetric images of the target area volume while the acoustic pulse is present in the target area volume.

14. The method of claim 13 wherein producing volumetric images of the underwater target area volume is performed at a real-time frame rate.

15. The method of claim 13 wherein producing volumetric images of the underwater target area volume is performed using a resolution of less than one wavelength.

16. The method of claim 13, further comprising:
comparing volumetric images for evidence of at least one of a partially or completely buried object.

17. The method of claim 16 wherein comparing volumetric images for evidence of buried objects includes detecting movement of floor materials relative to the buried objects.

18. The method of claim 13 further comprising:
recording the volumetric images.

19. The method of claim 13 further comprising:
discriminating interesting objects from non-interesting objects detected in the volumetric images.

20. The method of claim 13 further comprising:
detecting a proper distance from the target area volume for imaging purposes.

* * * * *